US012526145B2

(12) United States Patent
Rasmussen et al.

(10) Patent No.: US 12,526,145 B2
(45) Date of Patent: Jan. 13, 2026

(54) SECURE FORENSIC DATA COLLECTION ON MOBILE DEVICES

(71) Applicant: ModeOne Technologies Inc., Tustin, CA (US)

(72) Inventors: Matthew Rasmussen, Tustin, CA (US); Jason Purviance, Overland Park, KS (US); Ryan Frye, Olathe, KS (US); William Baldisser, Maldonado (UY)

(73) Assignee: ModeOne Technologies Inc., Overland Park, KS (US)

( * ) Notice: Subject to any disclaimer, the term of this patent is extended or adjusted under 35 U.S.C. 154(b) by 144 days.

(21) Appl. No.: 18/359,725

(22) Filed: Jul. 26, 2023

(65) Prior Publication Data

US 2025/0038980 A1    Jan. 30, 2025

(51) Int. Cl.
*H04L 9/32* (2006.01)
*G06F 21/62* (2013.01)
*H04L 9/40* (2022.01)

(52) U.S. Cl.
CPC ........ *H04L 9/3213* (2013.01); *G06F 21/6218* (2013.01); *H04L 63/30* (2013.01)

(58) Field of Classification Search
None
See application file for complete search history.

(56) References Cited

U.S. PATENT DOCUMENTS

| 11,025,272 B2* | 6/2021 | Dawood | H03M 7/3084 |
| 2020/0007531 A1* | 1/2020 | Koottayi | H04L 67/146 |

* cited by examiner

*Primary Examiner* — Brandon Hoffman
(74) *Attorney, Agent, or Firm* — Lynch LLP

(57) ABSTRACT

Embodiments of the inventive subject matter are directed to systems and methods designed to facilitate data collection from a target device. By installing software on a target device and then granting that application system-level access to the target device, embodiments of the inventive subject matter can safely, and cryptographically securely, grant access to files on the target device via uniquely generated uniform resource locators.

16 Claims, 5 Drawing Sheets

SECURE FORENSIC DATA COLLECTION ON MOBILE DEVICES

FIELD OF THE INVENTION

The field of the invention is forensic data collection.

BACKGROUND

The background description includes information that may be useful in understanding the present invention. It is not an admission that any of the information provided in this application is prior art or relevant to the presently claimed invention, or that any publication specifically or implicitly referenced is prior art.

Forensic data collection is a specialized field that involves the collection, preservation, and analysis of digital evidence for use in legal proceedings. This process involves the use of specialized tools and techniques to identify, collect, and analyze data from various digital devices, such as computers, smartphones, and servers. The goal of forensic data collection is to gather evidence that can be used to prove or disprove a crime or legal case. The field requires a high level of technical expertise and knowledge of the legal system. Forensic data collection professionals must be able to navigate complex technical issues and ensure that the evidence they collect is admissible in court.

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

It has yet to be appreciated that specialized software adapted for forensic data collection can both streamline the efficiency of forensic data collection from mobile devices while providing a secure chain-of-custody. In particular, existing attempts at forensic collection provide an exhaustive data image of an entire device. Such extensive collection is more expensive and more time consuming and is not always necessary in every case.

Thus, there is still a need in the art for a software solution for forensic collection of data from mobile devices that provides greater efficiency and cost savings compared to traditional methods of forensic data collection.

SUMMARY OF THE INVENTION

The present invention provides apparatus, systems, and methods in which forensic data may be collected securely from mobile devices and provided to a central server for later review.

In one aspect of the inventive subject matter, a method of data collection comprises presenting, on a first device, a dialogue requesting user permission for privileged file system access; in response to receiving the user permission, sending, by a first device, a request to a server for generation of a handshake token; receiving, on the first device, the handshake token generated by the server; displaying, on the first device, the handshake token; presenting, on a second device, a request to input the handshake token; receiving, on the first device from the server, a secure token; presenting, on the second device, a user-interface to select one or more data sources for collection from the first device; determining, by the first device, a count and size of files associated with the one or more data sources; generating, by the first device, a cryptographically signed token using a first file name; generating, by the first device, a first uniform-resource locator using the cryptographically signed token; using the first uniform-resource locator and security credentials associated with the secure token, sending, to the server from the first device, a second file name and data associated with the second file name to the server using the first uniform-resource locator and security credentials associated with the secure token; validating, on the server, that the second file name matches the first file name.

In another aspect of the inventive subject matter, presenting, on a first device, a dialogue requesting user permission for privileged file system access; in response to receiving the user permission, sending, by a first device, a request to a server for generation of a handshake token; receiving, on the first device, the handshake token generated by the server; displaying, on the first device, the handshake token; presenting, on a second device, a request to input the handshake token; receiving, on the first device from the server, a secure token; presenting, on the second device, a user-interface to select one or more data sources for collection from the first device; determining, by the first device, a count and size of files associated with the one or more data sources; generating, by the first device, a cryptographically signed token using a first file name; generating, by the first device, a first uniform-resource locator using the cryptographically signed token; using the first uniform-resource locator and security credentials associated with the secure token, sending, to the server from the first device, a second file name and data associated with the second file name to the server using the first uniform-resource locator and security credentials associated with the secure token; validating, on the server, that the second file name matches the first file name.

One should appreciate that the disclosed subject matter provides many advantageous technical effects including secure, defensible transmission of mobile device data while transmitting less than a complete record of an entire mobile device. Greater security is achieved by, for example, providing a handshake process incident to generation of temporary access credentials in the invention. Greater efficiency is provided by, for example, selecting a subset of data in the invention while maintaining data integrity and security. It should also be appreciated that the systems and methods of the inventive subject matter, does not depend on a particular software language or particular operating system.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Figure 1A:
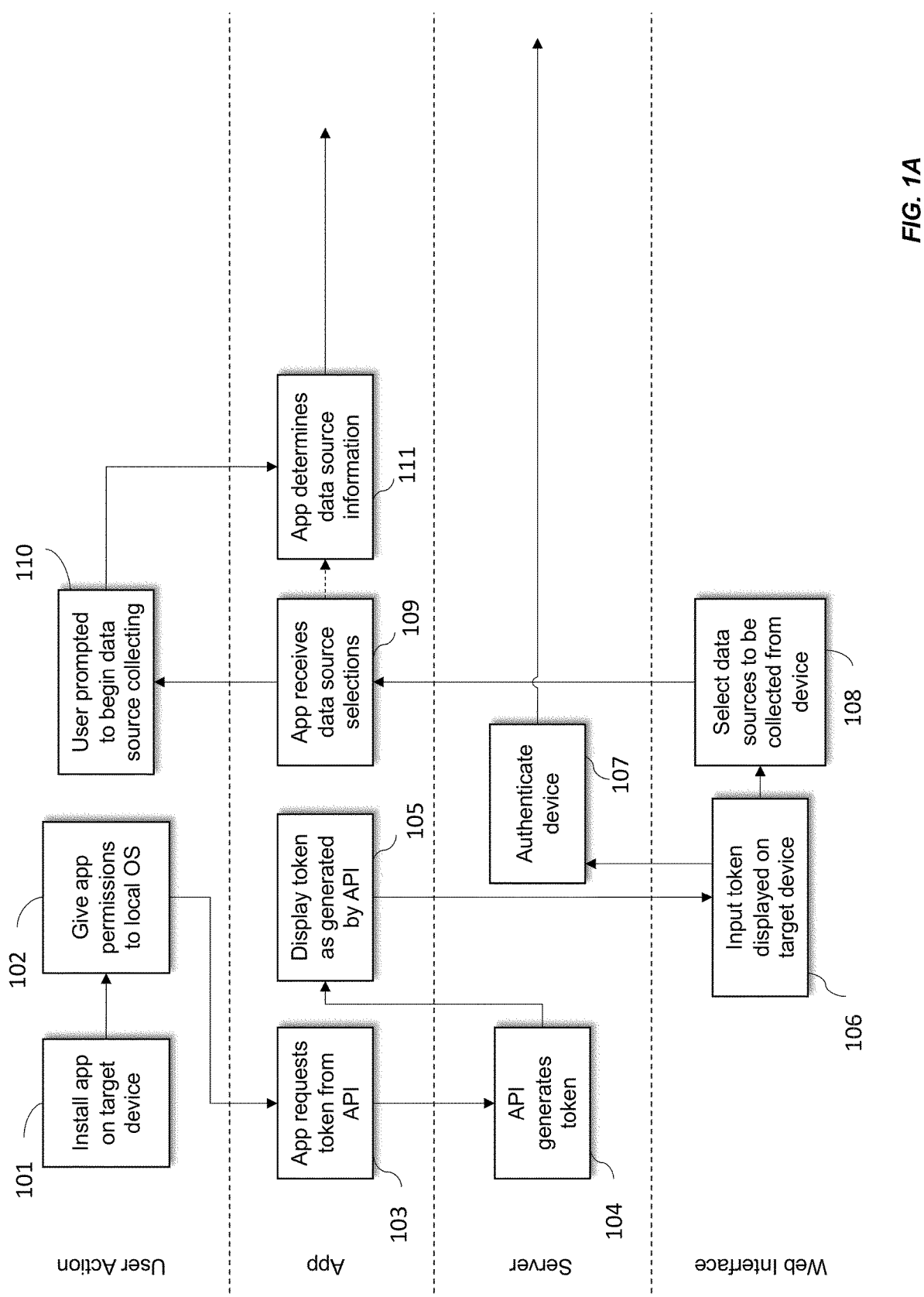
FIG. 1A is a flow diagram of an embodiment of the inventive subject matter continues on to FIG. 1C.
Figure 1B:
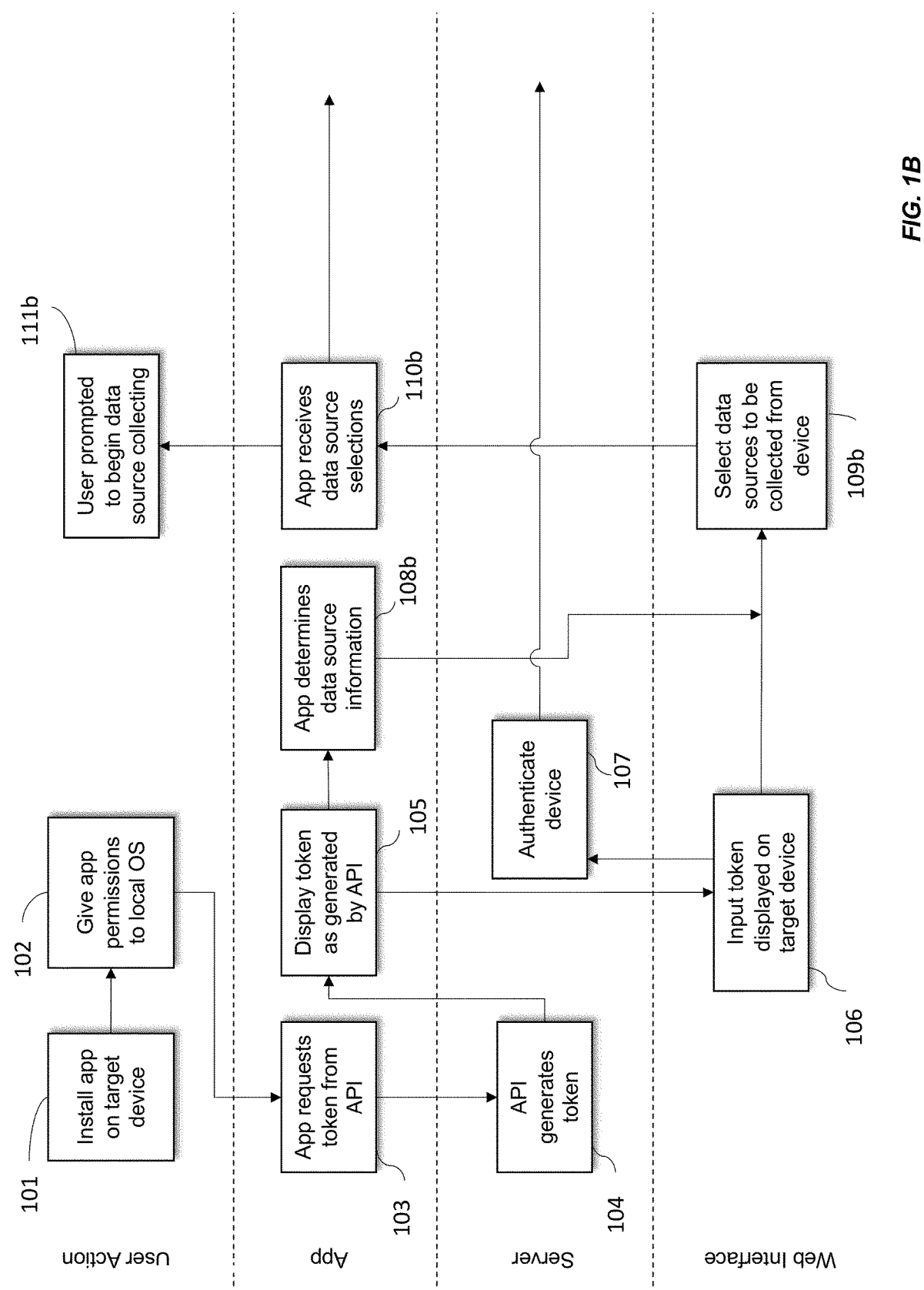
FIG. 1B is an alternate flow diagram of an embodiment of the inventive subject matter continues on to FIG. 1C.
Figure 1C:
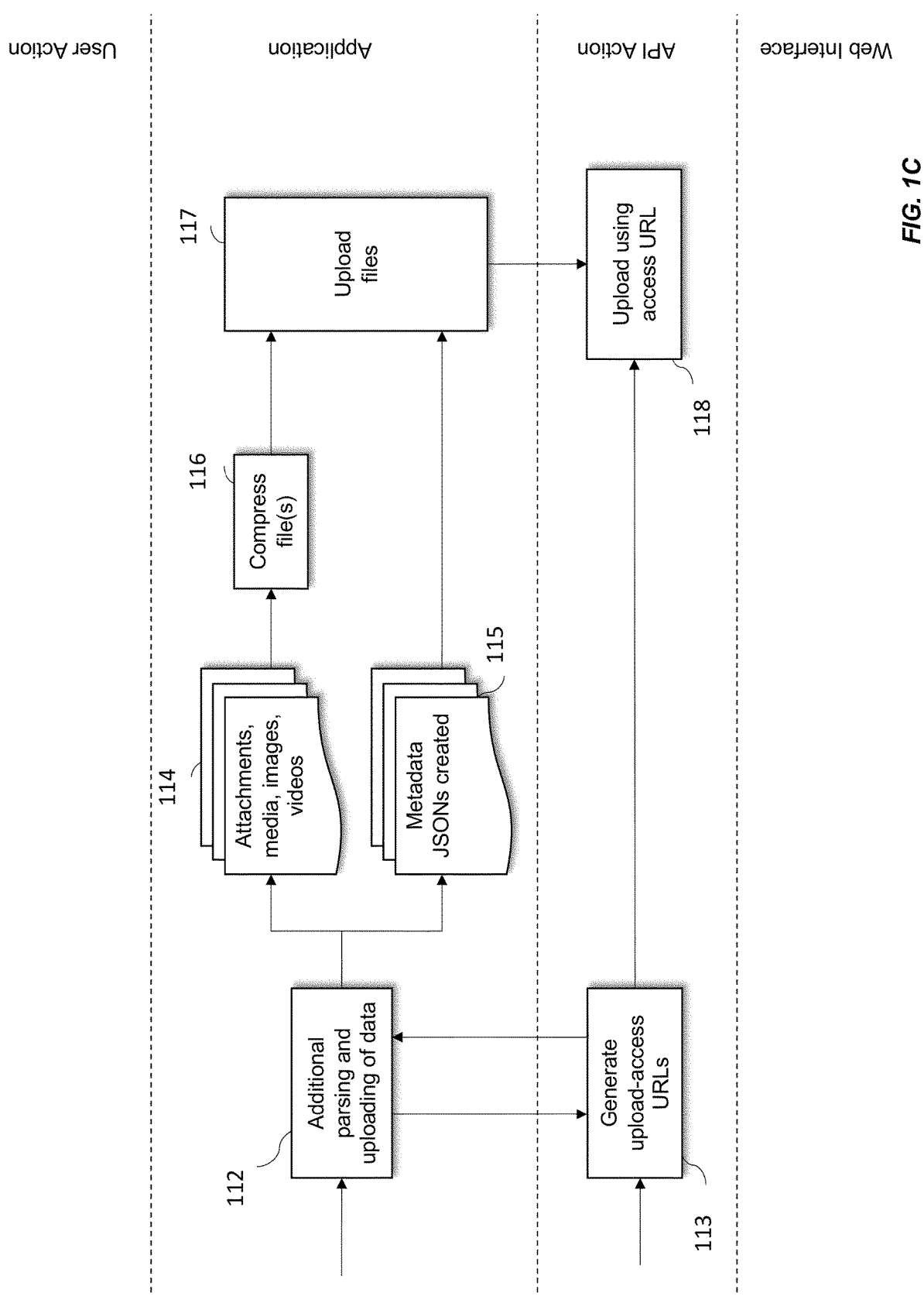
FIG. 1C is a continuation of the flow diagram shown in FIG. 1A and also of the alternate flow diagram shown in FIG. 1B.

FIGS. 1A through 1C depict embodiments of the present invention. FIGS. 1A and 1B can both flow into FIG. 1C, thus making up two different embodiments (FIG. 1A to 1C as one embodiment and FIG. 1B to 1C as another). Embodiments of the inventive subject matter are directed to systems and methods that are designed to allow data collection from a target device. Target devices contemplated in this application are devices having the Android operating system installed, though this operating system is just one example. By installing software on the target device, a user can select one or more data sources to collect from the target device. This can involve a handshake process between the target device and a second device that, in association with a server, is used to manage data collection from selected sources.

In FIGS. 1A and 1C, a flow control diagram of an embodiment of the invention is depicted. Step 101 indicates installation of an application on a target mobile device, such as a smartphone, tablet, e-reader, smartwatch, portable media player, or other device capable of running software and hardware for messaging applications.

At step 102, when executing the application of step 101, a user is prompted on a first device to provide Operating System permissions to access select file systems, including privileged file systems. In one embodiment, for example, in the context of Android software, file system permissions are crucial for maintaining the security and privacy of user data. Android uses file system permissions to control access to files and folders on a device. Each app on an Android device runs in a sandboxed environment, and its access to files and system resources is limited by the permissions granted to it. If an app does not have the necessary permissions to access a file, it cannot read that file. This ensures that apps cannot access or modify data from other apps or the operating system without the user's explicit permission. In this way, file system permissions help to prevent unauthorized access to sensitive information, such as passwords, credit card numbers, and other personal data. An App running on an Android device must request file system permissions from a user to provide to the Operating System to ensure the security and privacy of Android devices.

At step 103, the application sends a request to a server for a handshake token, which is a security mechanism used to ensure the authenticity and integrity of the data being exchanged between the target mobile device and the server. The handshake token may contain, for example, a random number or a unique identifier that is used to authenticate the target mobile device with the server and establish a shared secret key. This shared key may then be used to encrypt and decrypt the data being exchanged between the two devices, or to authenticate a pre-existing session established between client and server. The use of handshake tokens helps to prevent man-in-the-middle attacks and other forms of unauthorized access by ensuring that only trusted parties can communicate with each other. This can be an improvement over a design in which the application stores a persistent password or key used to perform authentication with a server because persistent storage of credentials on software that may be installed on target devices can be used by nefarious actors to obtain unauthorized access to remote systems.

At step 104, the server generates the handshake token in response to the request, and then sends the handshake to the target mobile device.

At step 105, the target mobile device displays the handshake token generated by the server.

At step 106, on a second device, a prompt is displayed in which to input the handshake token displayed on the first device. This prompt can be displayed, e.g., via web interface, allowing the handshake token to be input to the web interface and ultimately received by the server. In some embodiments, the second device is different from the first device, thereby erecting a further security barrier and permitting the creation of a verifiable audit log to which a technician could, if called upon, testify, for the authentication of a target mobile device. In some embodiments, the second device and the first device can be the same device, though discussion in this application treats them as separate for convenience of explanation. Upon input of the token on a second device, which has been previously authenticated with the server, the second device sends the inputted token to the server, which in turn creates or authenticates a set of permissions associated with a cryptographic key associated with the handshake token to enable the target mobile device to upload data to the server.

At step 107, the server receives a message from the second device as a result of step 106 that indicates authentication of the device and, in some embodiments, uses the message received from the second device to generate cryptographic keys for secure communication.

At step 108, on the second device, a prompt is displayed showing the potential sources of collection. Upon receiving user input indicating a selection of data sources for collection from the target mobile device, the second device sends the selection to the server. Upon receipt of the selection, the server sends the selection, in some embodiments secured using the cryptographic key, to the target mobile device.

At step 109, on the first device, the installed application receives, preferably through an asynchronous method, the data source selections made at step 107. In one embodiment, the device prompts the user to begin data source collecting, step 110, which then initiates progression to step 111. In another embodiment or configuration, the installed application begins data source collection without further user prompt, bypassing step 108 and proceeding to step 110.

At step 110, a prompt is displayed to the user to initiate data source collection upon user input. The prompt may be displayed to the screen using, e.g. on an Android device, any method of displaying a prompt or information to a device screen, such as a TextView dialogue.

At step 111, the first device performs an assessment of installed software on the target mobile device. This step involves collecting a list of software installed on the target device and then matching that software to a list of messaging apps that are compatible with data collection. Potential sources of collection include the file directories and associated data of messaging apps, such as, on an Android device, "Messages," "Android Messages," WhatsApp, Facebook Messenger, Telegram, Signal, Viber, Google Hangouts, Skype, Snapchat, WeChat, or any other App supporting Rich Communication Services or SMS/MMS capabilities. In one embodiment, for example, on an Android device, this step can be performed by calling getPackageManager( ), a method of the Context class that returns a Package Manager instance, which can then be used to call getInstalledApplications(int flags), which is a method that retrieves a list of ApplicationInfo objects, each of which corresponds to an application package that is installed on the device. Data from the ApplicationInfo objects can be matched to a pre-existing list of software that is compatible with the collection methods of the installed app. It can alternatively, e.g., be generated by iterating through packages in getInstalledPackages for installed user applications.

In some embodiments, as depicted in FIG. 1A, a user is prompted to begin source collecting at step 110 through, e.g., a prompt on the first device.

Moving to step 112 in FIG. 1C (which flows from step 111 in FIG. 1A), the application conducts additional parsing and uploading of data. This step can involve, e.g., determining message counts and sizes of targeted data associated with the selection of data sources. This may be executed through, for example, iterating through file directories associated with the selected data sources to identify relevant files, determine the size of each file, and, optionally, sum the total file sizes. A count of messages associated with a selection of data sources, may be determined by locating a file associated with a database of messages. Such a file may be, for example, a database file with a format of MySQL, PostgreSQL, Microsoft SQL, Oracle DB, MongoDB, CouchDB, Redis, or SQLite.

FIG. 1B depicts an alternate process that can be carried out before progressing to the steps described in FIG. 1C. Many of the steps described in FIG. 1B are the same as steps described in FIG. 1A, and thus the same step numbers are assigned to steps 100-107. In FIG. 1B, following token display step 105, the installed application determines available source information in step 108b, performing the same process as step 111 indicated in FIG. 1A. The first device, following the instructions of the installed application, then passes this information through the server and back to the second device, which can thereby display the available data sources for collection at step 109b, excluding selections that are not available on the target device.

In step 110b, the first device, i.e., the target device, receives the data source selections made on the second device at step 109b. Only selected data will be processed and uploaded according to the remaining process. Following step 110b, the user is prompted at step 111b to begin source collection.

FIG. 1C begins at steps 112 and 113, indicating a continuous process with either FIG. 1A or, alternately, FIG. 1B. At step 112, the application determines whether a subset of the files within the selected data sources should be compressed, to reduce the overall number of files to be sent to the server. In addition to reducing transmission overhead, data compression also reduces the total file size to be transmitted, increasing overall transmission speed. Data separated for compression, indicated in step 114 as attachments, media, images, videos and so on, is compressed in step 116. Data not indicated for compression, such as metadata, JSONs, etc. in step 115, is passed directly to upload step 117. Step 117 thus describes that data from step 115 and compressed files from step 116 are uploaded to a server to facilitate and control access to any uploaded compressed files, data, and the like.

Thus, at step 117, the application initiates transmission of data to the server. Transmission in this context may comprise hashing a transmission file that comprises one or more files from the selected data sources, sending the name of the file to the server, and requesting a uniform-resource locator from the server corresponding on the server with the name of the transmission file. Transmission may further comprise sending the associated transmission file using the uniform-resource locator returned from the server, authenticating the transmission with the cryptographic key, and sending the hash associated with the transmission file to the server.

One advantage to such approach is redundancy in data validation-sending the transmission file using the cryptographic key provides both validation and security. Further, because the server associates the uniform-resource locator with a corresponding transmission file name, the server can reject data transmission attempts that do not correspond to the correct transmission file name. Finally, the server can separately determine the hash of a transmitted file, then validate the file by comparing the determined hash to the transmitted hash. If the hashes do not match, the data can be rejected, and a transmission re-attempt may occur.

Figure 2:
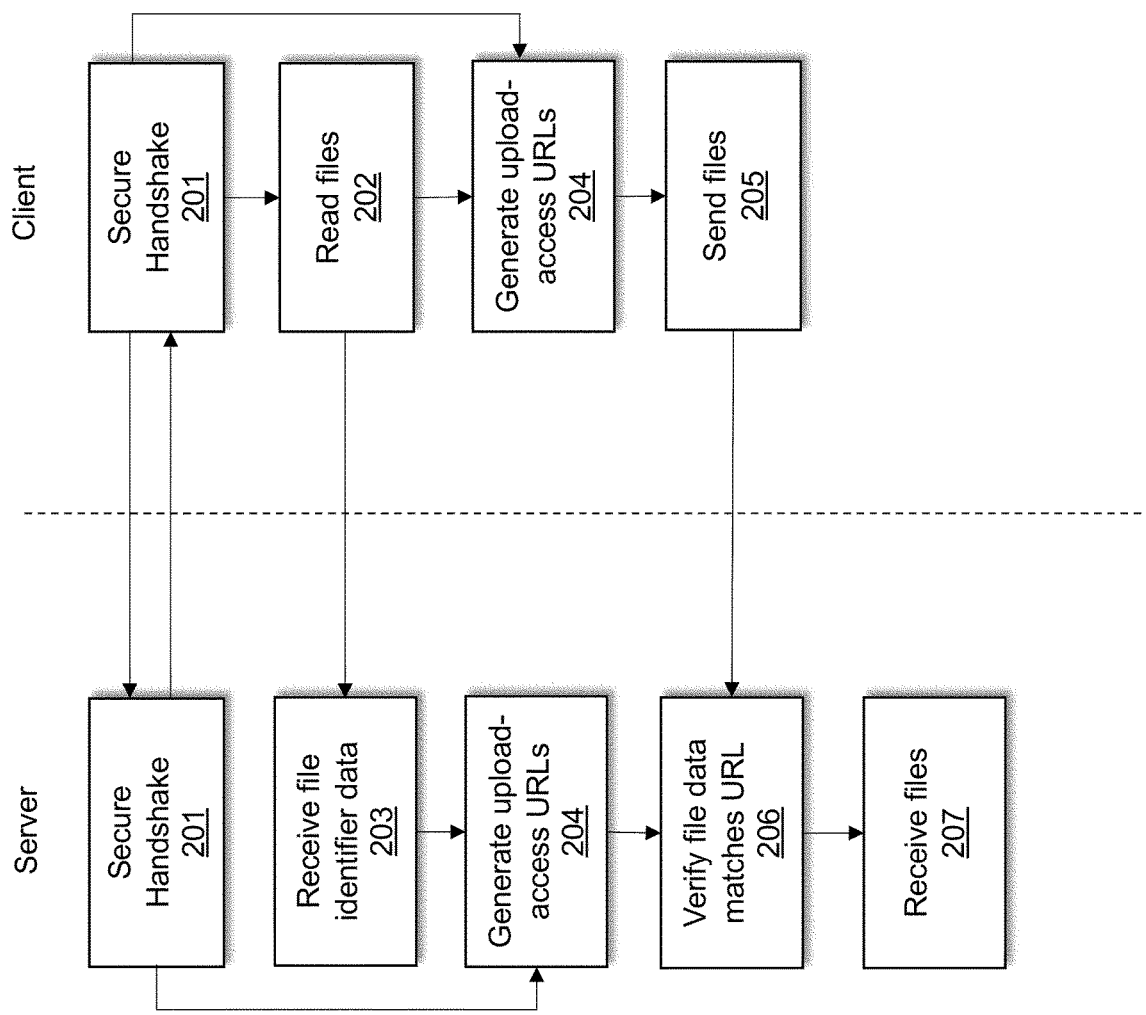
FIG. 2 shows a diagram of an embodiment of an authenticated upload process of the inventive subject matter.

In FIG. 2, an embodiment of the authenticated upload process is shown. Step 201 (labeled on both the server side and the client side given the nature of this step) initiates a secure handshake between server and client using any method of client-server secure authentication, such as the provisioning of a username and password or a multi-factor authentication process. At step 202, the client reads files on the client device and transmits file identifier data to the server, which receives the file identifier data at step 203. File identifier data can include file names, file size, file hashes, and the like.

At step 204, both the server and the client, using the security credentials generated on both server and client (e.g., using cryptographically signed tokens) through the secure handshake process, each independently generate unique and identical uniform-resource locators. On the client, the uniform-resource locators generated provide a route to upload files to the server. On the server, the unique uniform-resource locators provide allowable upload of data with sandboxed write-access to a particular portion of the server corresponding to the specific client and corresponding to specific file identifier data received in step 203. This arrangement helps prevent potential attacks whereby a third party could impersonate a client and upload false or fraudulent data to the server that purports to be client data.

At step 205, the client sends files and data to the server using the URLs generated at step 204, where the files correspond to the files read in step 202. At step 206, the server verifies the file data matches the file-and-client-specific URL through which the file has been uploaded. Optionally, the server verifies the file data matches other file identifier data, such as a hash. If the server determines the verification is acceptable, the server stores the file in a persistent data storage location at step 207.

Figure 3:
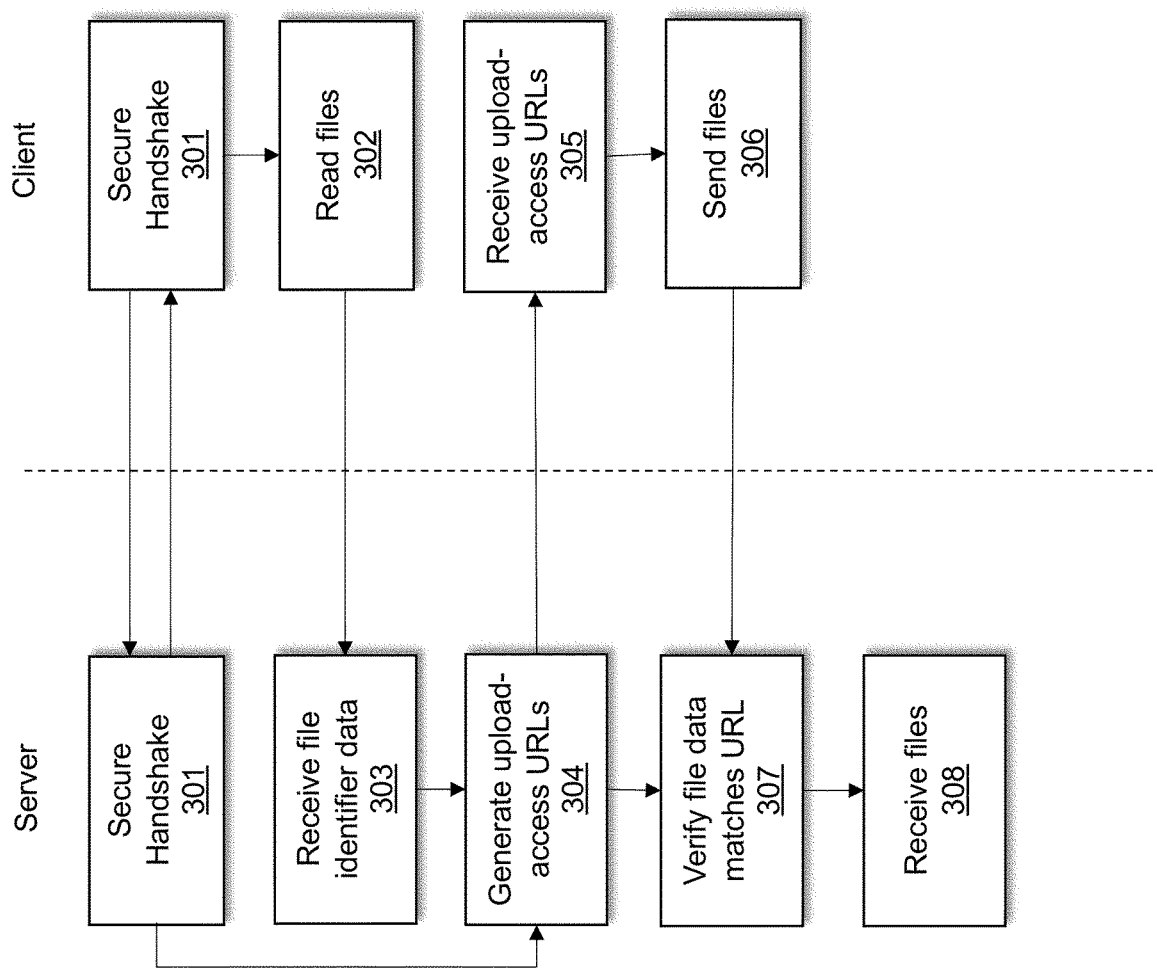
FIG. 3 shows a diagram of another embodiment of an authenticated upload process of the inventive subject matter.

FIG. 3 depicts an alternate embodiment of the process shown in FIG. 2. In FIG. 3, the process begins as in FIG. 2 with a secure handshake 301 between client and server. The client then reads files in step 302, as in step 202, and transmits file identifier data to the server, which reads the data at step 303, preferably with asynchronous communication methods. In contrast to FIG. 2, the process in FIG. 3 includes only server-generation of upload-access URLs that are file-and-client specific in step 304. The server than provisions these URLs to the client to receive at step 305, along with associated information to associate each provisioned URL to a specific file.

As in the embodiment described in FIG. 2, the client at step 306 sends the files to the server using the specific URLs associated with each file. At step 307, the server verifies that each file transmitted matches the specific URL for which it is intended to be associated. Optionally, the server verifies the file data matches other file identifier data, such as a hash. If the server determines the verification is acceptable, the server stores the file in a persistent data storage.

The arrangement described above by relation to FIGS. 2 and 3 provides additional security where the client device may have associated malware that could attempt to interfere, disrupt, or corrupt the secure collection of data by providing a different version of a file to the server than exists in ordinary storage on the client device, or by intentionally providing malware to the server.

Thus, specific compositions and methods of an authenticated communications have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method of data collection, comprising the steps of: presenting, on a first device, a dialogue requesting user permission for privileged file system access;

in response to receiving the user permission, sending, by the first device, a request to a server for generation of a handshake token;

receiving, on the first device, the handshake token generated by the server;

displaying, on the first device, the handshake token;

presenting, on a second device, a request to input the handshake token;

wherein the first device is separate from the second device;

authenticating an associated session using the handshake token;

determining, on the first device, available data collection sources;

presenting, on the second device, a user-interface to select one or more data sources for collection from the first device;

determining, on the first device, a count and size of files associated with the one or more data sources;

generating a cryptographically signed token;

generating a first uniform-resource locator using the cryptographically signed token and using a first file identifier;

on the first device, using the first uniform-resource locator, sending to the server a second file identifier and data associated with the second file identifier; and validating, on the server, that the second file identifier matches the first file identifier.

2. The method of claim 1, wherein the step of determining, on the first device, available data collection sources further comprises sending information regarding the available data collection sources to the server.

3. The method of claim 1, wherein the step of presenting, on the second device, a user-interface to select one or more data sources for collection from the first device further comprises excluding data sources determined to be unavailable for collection from the first device.

4. The method of claim 1, wherein the step of generating the first uniform-resource locator using the cryptographically signed token is performed by the server.

5. The method of claim 1, wherein the step of authenticating the associated session using the handshake token is performed by the server.

6. The method of claim 1, further comprising the step of sending the first file identifier to the server.

7. A method data collection from a target device, comprising the steps of:

receiving user permission for privileged file system access on the target device;

sending, by the target device to a server, a handshake token request;

receiving, by the target device, a handshake token generated by the server in response to the handshake token request;

receiving, by the target device, a message indicating authentication of a session based on the handshake token;

determining, on the target device, available data collection sources;

receiving, by the target device, a selection of data collection sources from the server;

receiving, by the target device, a first uniform-resource locator generated by the server using a cryptographically signed token;

on the target device, using the first uniform-resource locator, sending to the server a first file identifier and data associated with a second file identifier; and receiving, on the target device, a message from the server indicating that the second file identifier matches the first file identifier.

8. The method of claim 7, wherein the first uniform-resource locator generated by the server is generated using the cryptographically signed token and the first file identifier.

9. The method of claim 8, wherein the first file identifier is associated with a file from one of the available data collection sources.

10. The method of claim 7, further comprising the step of determining, on the target device, a count and size of files associated with each of the available data collection sources.

11. A method data collection from a target device, comprising the steps of:
- receiving user permission for privileged file system access on the target device;
- sending, by the target device to a server, a handshake token request;
- receiving, by the target device, a handshake token generated by the server in response to the handshake token request;
- authenticating, on a second device, a session using the handshake token;
- wherein the target device is separate from the second device;
- presenting, on the second device, a user-interface to select one or more data collection sources for collection on the target device;
- generating, by the server, a first uniform-resource locator using a cryptographic token and a first file identifier;
- on the first device, using the first uniform-resource locator, sending to the server a second file identifier and data associated with the second file identifier; and
- validating, on the server, that the second file identifier matches the first file identifier.

12. The method of claim 11, further comprising the step of determining, on the target device, available data collection sources and transmitting a list of available data collection sources to the server.

13. The method of claim 12, further comprising the step of determining, on the target device, available data collection sources and transmitting a list of available data collection sources to the server.

14. The method of claim 13, wherein the step of presenting, on the second device, the user-interface to select one or more data collection sources for collection on the target device, further comprises excluding from possible selection data collection sources that are determined not to be available.

15. The method of claim 11, further comprising the step of determining, on the target device, a count and size of files associated with each of the one or more data collection sources.

16. The method of claim 15, further comprising, based on the size and type of a first file associated with the second file identifier, the step of compressing the first file before sending to the server data associated with the second file identifier.

* * * * *